US012712136B2

(12) United States Patent
Hiltner et al.

(10) Patent No.: US 12,712,136 B2
(45) Date of Patent: Aug. 18, 2026

(54) ON-LOAD TAP CHANGER AND TAP-CHANGING TRANSFORMER HAVING AN ON-LOAD TAP CHANGER

(71) Applicant: Maschinenfabrik Reinhausen GmbH, Regensburg (DE)

(72) Inventors: Robert Hiltner, Bernhardswald (DE); Christian Muenzberg, Biburg (DE); Stefan Feldmeier, Bernhardswald (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 809 days.

(21) Appl. No.: 17/775,892

(22) PCT Filed: Oct. 1, 2020

(86) PCT No.: PCT/EP2020/077539
§ 371 (c)(1),
(2) Date: May 11, 2022

(87) PCT Pub. No.: WO2021/099022
PCT Pub. Date: May 27, 2021

(65) Prior Publication Data

US 2022/0392717 A1 Dec. 8, 2022

(30) Foreign Application Priority Data

Nov. 19, 2019 (DE) ..................... 10 2019 131 169.1

(51) Int. Cl.
*H01H 9/00* (2006.01)
*H01F 29/02* (2006.01)

(52) U.S. Cl.
CPC ......... *H01H 9/0027* (2013.01); *H01F 29/025* (2013.01)

(58) Field of Classification Search
CPC .......... H01H 1/56; H01H 15/08; H01H 19/12; H01H 21/20; H01H 2003/00; H01H 2009/00; H01H 2009/0005; H01H 2009/0016; H01H 2009/0061; H01H 9/0016; H01H 9/0027; H01H 9/00; H01H 9/0005; H01H 9/0011; H01H 9/0066; H01H 9/0038; H01F 29/025; H01F 29/04; H01F 29/00; H01F 29/02
(Continued)

(56) References Cited

U.S. PATENT DOCUMENTS 6,060,669 A 5/2000 Dohnal et al.
11,798,752 B2 * 10/2023 Schuster .................. H01H 1/22
(Continued)

FOREIGN PATENT DOCUMENTS

CN 206947194 U 1/2018
CN 110060891 A 7/2019
(Continued)

*Primary Examiner* — Anthony R Jimenez
(74) *Attorney, Agent, or Firm* — LEYDIG, VOIT & MAYER, LTD.

(57) ABSTRACT

An on-load tap-changer uninterruptedly operates a diverter switch between different winding taps of a tap-changing transformer. The on-load tap-changer has an on-load tap-changer plate; a selector; and a diverter switch. The selector and the diverter switch are mounted on the on-load tap-changer plate.

10 Claims, 15 Drawing Sheets

(58) Field of Classification Search
USPC ........................................................ 200/11 TC
See application file for complete search history.

(56) References Cited

U.S. PATENT DOCUMENTS

| | | | |
|---|---|---|---|
| 2015/0028978 | A1 | 1/2015 | Bieringer et al. |
| 2015/0171783 | A1 | 6/2015 | Kammerl et al. |
| 2019/0066940 | A1 | 2/2019 | Meyer et al. |
| 2019/0228922 | A1 | 7/2019 | Stocker et al. |

FOREIGN PATENT DOCUMENTS

| | | | |
|---|---|---|---|
| DE | 19743864 | C1 | 4/1999 |
| DE | 102012103490 | A1 | 10/2013 |
| DE | 102012105152 | A1 | 12/2013 |
| DE | 102016104500 | B3 | 5/2017 |
| DE | 102016117526 | B3 | 2/2018 |
| JP | 2017017107 | A | 11/2017 |

* cited by examiner

ON-LOAD TAP CHANGER AND TAP-CHANGING TRANSFORMER HAVING AN ON-LOAD TAP CHANGER

CROSS REFERENCE TO RELATED APPLICATIONS

This application is a U.S. National Phase application under 35 U.S.C. § 371 of International Application No. PCT/EP2020/077539, filed on Oct. 1, 2020, and claims benefit to German Patent Application No. DE 10 2019 131 169.1, filed on Nov. 19, 2019. The International Application was published in German on May 27, 2021 as WO 2021/099022 A1 under PCT Article 21(2).

FIELD

The present disclosure relates to an on-load tap-changer for uninterrupted diverter switch operation between different winding taps of a tap-changing transformer.

The present disclosure further relates to a tap-changing transformer with an on-load tap-changer for uninterrupted diverter switch operation between different winding taps of the tap-changing transformer.

BACKGROUND

On-load tap-changers usually have a diverter switch and a selector. The diverter switch may have vacuum interrupters and transition resistors and may be arranged in a cylindrical vessel. The selector is made up of a multiplicity of bars arranged in a circle. Contacts which serve as connections for a tap winding are arranged at different levels on the bars. Two selector arms are secured to a switching pillar within the selector. They make contact with the contacts on the bars. Diverter switch and selector are connected to each other via a gear unit.

The contacts of the selector are connected to a winding tap of a tap winding. Since the contacts are arranged in the circle, the lines to the tap winding are designed to be very long in part. The lines in the tap transformer have a particularly large amount of space here, since the predefined insulation distances between the lines must be observed.

SUMMARY

In an embodiment, the present disclosure provides an on-load tap-changer that uninterruptedly operates a diverter switch between different winding taps of a tap-changing transformer. The on-load tap-changer has an on-load tap-changer plate; a selector; and a diverter switch. The selector and the diverter switch are mounted on the on-load tap-changer plate.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
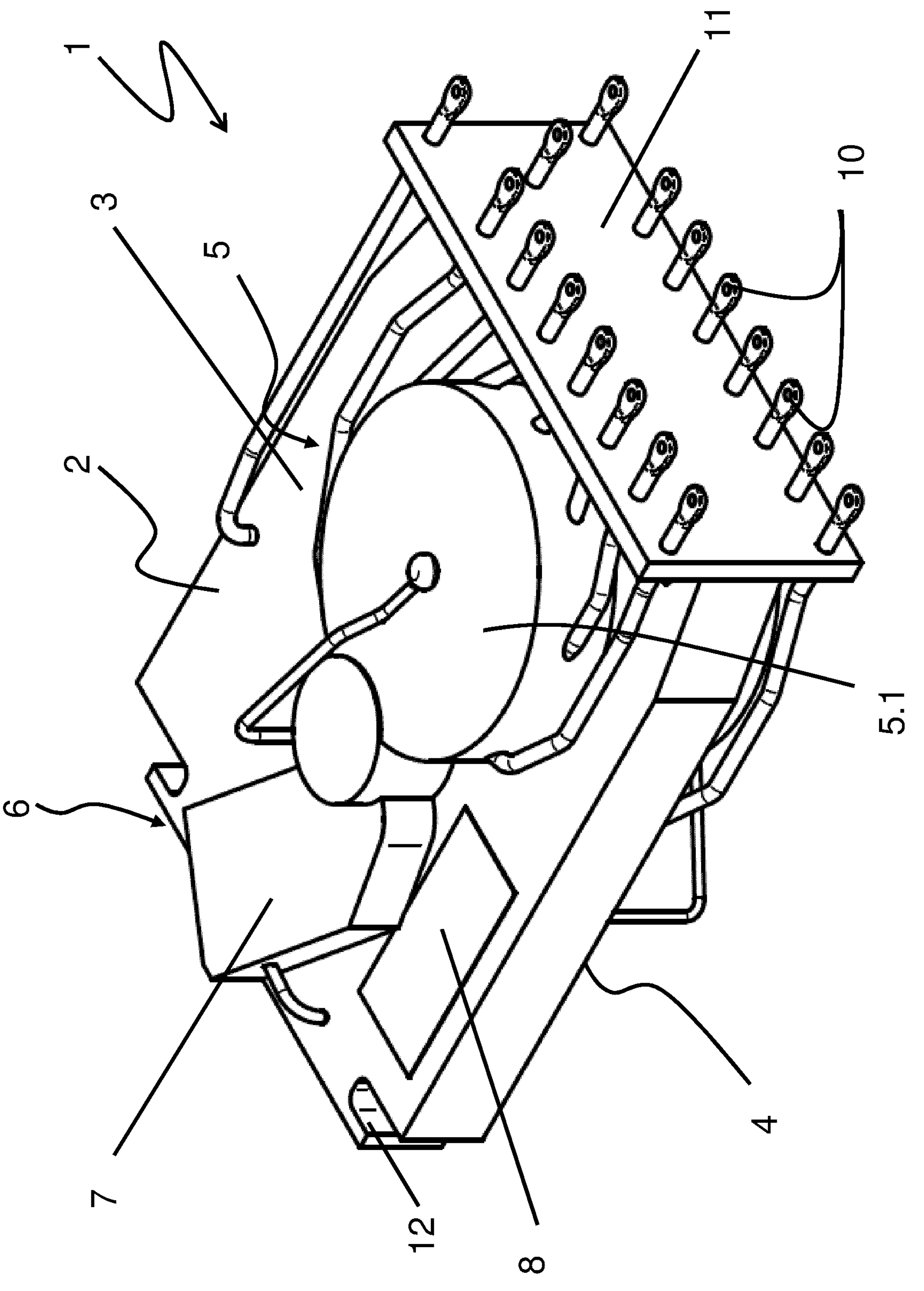
FIG. 1*a* and FIG. 1*b* show a first embodiment of an on-load tap changer.

One or more aspects of the present disclosure provide an on-load tap-changer which is of a simple and compact construction and thus can be installed easily and in a space-saving manner in a tap-changing transformer.

One or more aspects of the present disclosure provide a tap-changing transformer having an on-load tap-changer which is of a simple and compact construction.

According to a first aspect, the present disclosure provides an on-load tap changer for uninterrupted diverter switch operation between different winding taps of a tap-changing transformer, comprising an on-load tap changer plate, a selector and a diverter switch, wherein the selector and the diverter switch are mounted on the on-load tap-changer plate.

Due the mounting of the on-load tap-changer and the selector and in particular the relevant individual parts on an on-load tap-changer plate, the on-load tap-changer is smaller and more compact as a whole. In comparison to the on-load tap-changers known from the prior art, an on-load tap-changer plate can be mounted in a particularly space-saving manner in a tap-changing transformer and can be connected to further on-load tap-changer plates in different ways.

It can be provided that the on-load tap-changer comprises a vacuum interrupter, a transition resistor and a bridge switch.

The on-load tap-changer can be designed in any way as required and for example can comprise at least one additional or further vacuum interrupters and/or one additional or further transition resistors and/or one additional or further bridge switches.

The on-load tap-changer can be designed in any way as required and, for example, can comprise at least one current-limiting element or a connection for a current-limiting element. The current-limiting element can be designed as a transition resistor, reactor, varistor or the like.

It can be provided that the vacuum interrupter is mounted on a first side of the on-load tap-changer plate and the transition resistor and the bridge switch are mounted on a second, opposite side of the on-load tap-changer plate. This is particularly space-saving, since the essential parts are distributed on both sides of the on-load tap-changer plate. The installation space is utilized optimally.

The on-load tap-changer can be designed in any way as required and, for example, the vacuum interrupter and/or the transition resistor and/or the bridge switch are arranged only on the first side or only on the second side.

It can be provided that the selector comprises a first selector arm, a second selector arm and selector contacts. The selector contacts extend here from a first side of the on-load tap-changer plate to a second side of the on-load tap-changer plate. It can be provided that the selector comprises a change-over selector.

It can be provided that the first selector arm is mounted on the first side of the on-load tap-changer plate and the second selector arm and the change-over selector are mounted on a second, opposite side of the on-load tap-changer plate.

The selector can be designed in any way as required and can be constructed, for example, in a rotary or linear manner. Depending on the implementation, the selector arms can be arranged on a first side of the on-load tap-changer plate and the change-over selector can be arranged on the second side of the on-load tap-changer plate. The change-over selector can also be designed in a rotary or linear manner.

It can be provided that the on-load tap-changer plate is cuboidal and connections for the selector are arranged on one side in a wall element. The targeted arrangement of the selector connections on one side makes it easier to connect these to the winding taps of a tap winding of a tap-changing transformer.

It can be provided that the on-load tap-changer has three on-load tap-changer plates, each with a diverter switch and each with a selector. The three on-load tap-changer plates are then mechanically connected to one another via a frame. The on-load tap-changer and selector on the on-load tap-changer plates are actuated via a common drive shaft by means of a Geneva wheel, driver, gearwheel or the like.

The frame can be formed arbitrarily as required and can consist, for example, of four bars and a top plate. The on-load tap-changer plates are then connected to the bars interlockingly and/or by frictional engagement.

The on-load tap-changer plates can be arranged arbitrarily relative to one another. For example, the on-load tap-changer plates can be arranged in different planes horizontally or vertically. Furthermore, the on-load tap-changer plates can be arranged in a common plane horizontally or vertically.

According to a second aspect, the present disclosure provides a tap-changing transformer with an on-load tap-changer which is arranged in the interior of the tap-changing transformer next to and/or above and/or below an active part.

It can be provided that the on-load tap-changer plate of the on-load tap-changer is oriented horizontally or vertically relative to the active part.

It can be provided that a motor for actuating a drive shaft of the on-load tap-changer is arranged inside the tap-changing transformer or outside the tap-changing transformer.

It can be provided that a motor is connected directly to the drive shaft or indirectly to the drive shaft of the on-load tap changer via a gear unit, bevel gear or linkage.

It can be provided that the on-load tap-changer is fastened via a top plate to the yoke of the active part or to the housing, in particular the cover or a wall of the tap-changing transformer.

Identical reference signs are used for elements of the disclosure that are identical or functionally identical. Furthermore, for the sake of clarity, each of the individual figures contains only those reference signs necessary for the description of the figure. The illustrated embodiments merely illustrate examples of how the on-load tap changer according to the present disclosure can be designed; and therefore, do not represent a final delimitation of the invention.

Figure 1B:
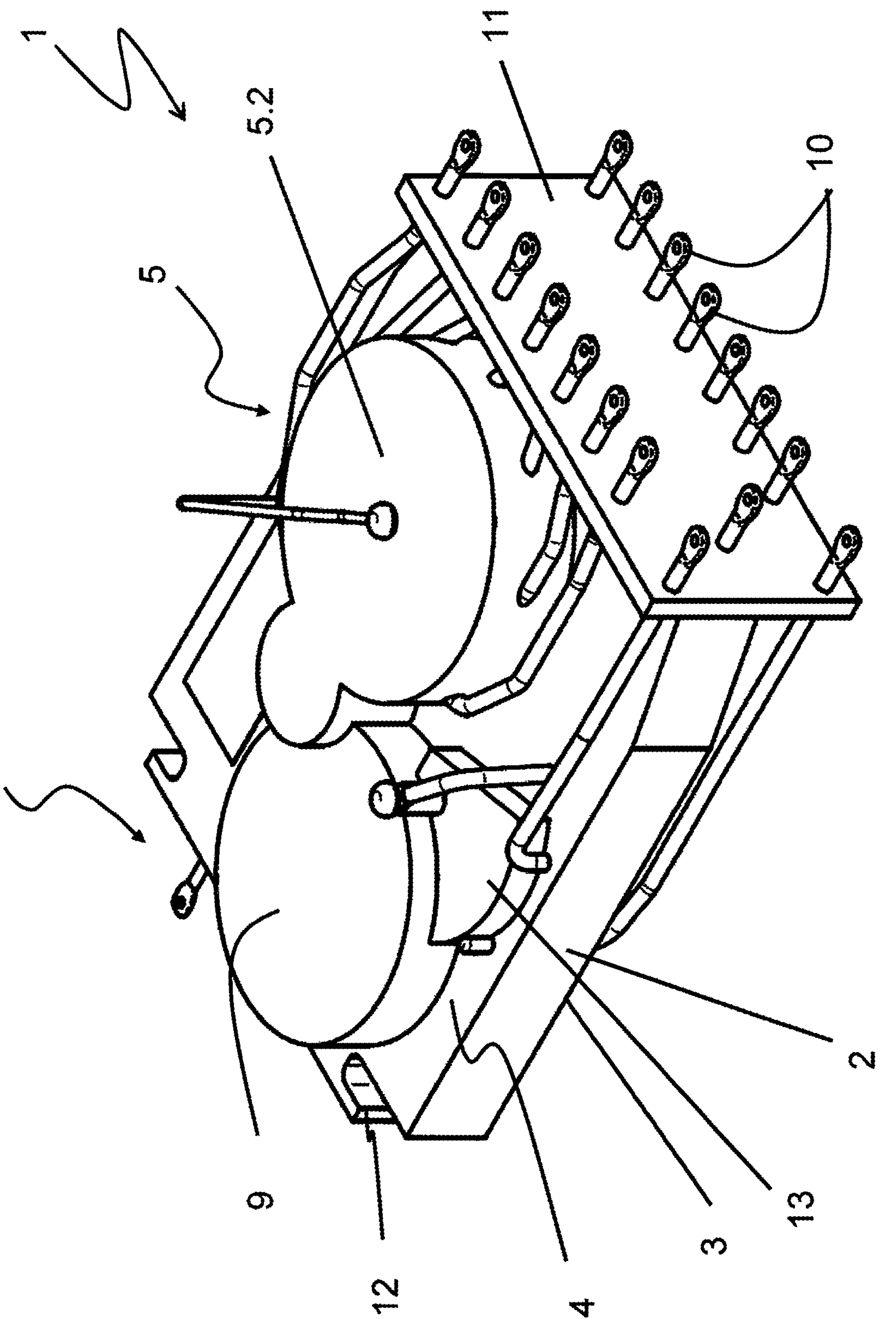

FIGS. 1*a* and 1*b* show an on-load tap-changer 1 according to the an embodiment of the present disclosure. This has a substantially rectangular on-load tap-changer plate 2, which is formed as a cuboid, quadrate or rectangular parallelepiped. The on-load tap-changer plate 2 has a first side 3 and a second, opposite side 4. A selector 5 and an on-load tap-changer 6 are mounted on the on-load tap-changer plate 2. The on-load tap-changer 6 has a vacuum interrupter 7, a transition resistor 8 and a bridge switch 9. The selector 5 has a first selector arm 5.1 and a second selector arm 5.2. Furthermore, the selector 5 has selector contacts which are connected via corresponding connections 10 to winding taps of a tap winding.

The selector 5 is of a rotary design in the embodiment shown here. In this case, the selector contacts are arranged in a circle and extend from the first side 3 through the on-load tap-changer plate 2 to the second side 4. The selector arms 5.1, 5.2 are mounted rotatably on a bearing axis and perform a rotary movement, during which the corresponding selector contacts are contacted. The first selector arm 5.1 is arranged on the first side 3 of the on-load tap-changer plate 2 and the second selector arm 5.2 is arranged on the second, opposite side 4. The selector contacts are likewise arranged on both sides 3, 4 of the on-load taps-changer plate 2.

The individual parts of the on-load tap-changer 6 are in this embodiment likewise arranged on the first side 3 and on the second side 4 of the on-load tap-changer plate 2. The bridge switch 9 is mounted on the second side 4. The vacuum interrupter 7 and the transition resistor 8 are mounted on the first side 3. It is possible, however, to mount or to arrange all parts of the on-load tap-changer 6 on the first or on the second side 3, 4 of the on-load tap-changer plate 2.

In the embodiment shown here, the on-load tap-changer 1 has precisely one vacuum interrupter 7 and precisely one bridge switch 9. However, it is also possible that a plurality of vacuum interrupters, a plurality of bridge switches and also further switches or main switching contacts are mounted on the on-load tap-changer plate 2. The transition resistor 8 is modular and can be extended, that is to say enlarged, or made smaller according to requirements.

The on-load tap-changer plate 2 consists of an insulating material, such as plastic, polyamide, polyphthalamide with glass fibers, GRP or phenolic paper. The on-load tap-changer 2 can be designed as a plastic injection-molded part.

The on-load tap-changer 2 has wall elements 11, 12 at the outer edges. The connections 10 of the selector 5 and in particular of the selector contacts are arranged in a first wall element 11 of the on-load tap-changer plate 2. The connection for the neutral point is arranged in an opposite second wall element 12 of a second outer edge of the on-load tap-changer plate 2. Since all connections 10 of the selector 5 are arranged in a wall element 11, that is to say on a side of the on-load tap-changer plate 2, the on-load tap-changer 2 can be oriented or placed particularly optimally in the direction of the tap winding. Connecting the selector 5 to the tap winding is particularly simple.

Alternatively, instead of the transition resistor 8, any current-limiting element can also be arranged or mounted on the on-load tap-changer plate 2. This can be a reactor in the form of a coil or winding or also a varistor. Alternatively, connections can be provided on the on-load tap-changer plate which make it possible for example to connect a reactor which is arranged in the immediate vicinity of the on-load tap-changer plate.

Figure 2:
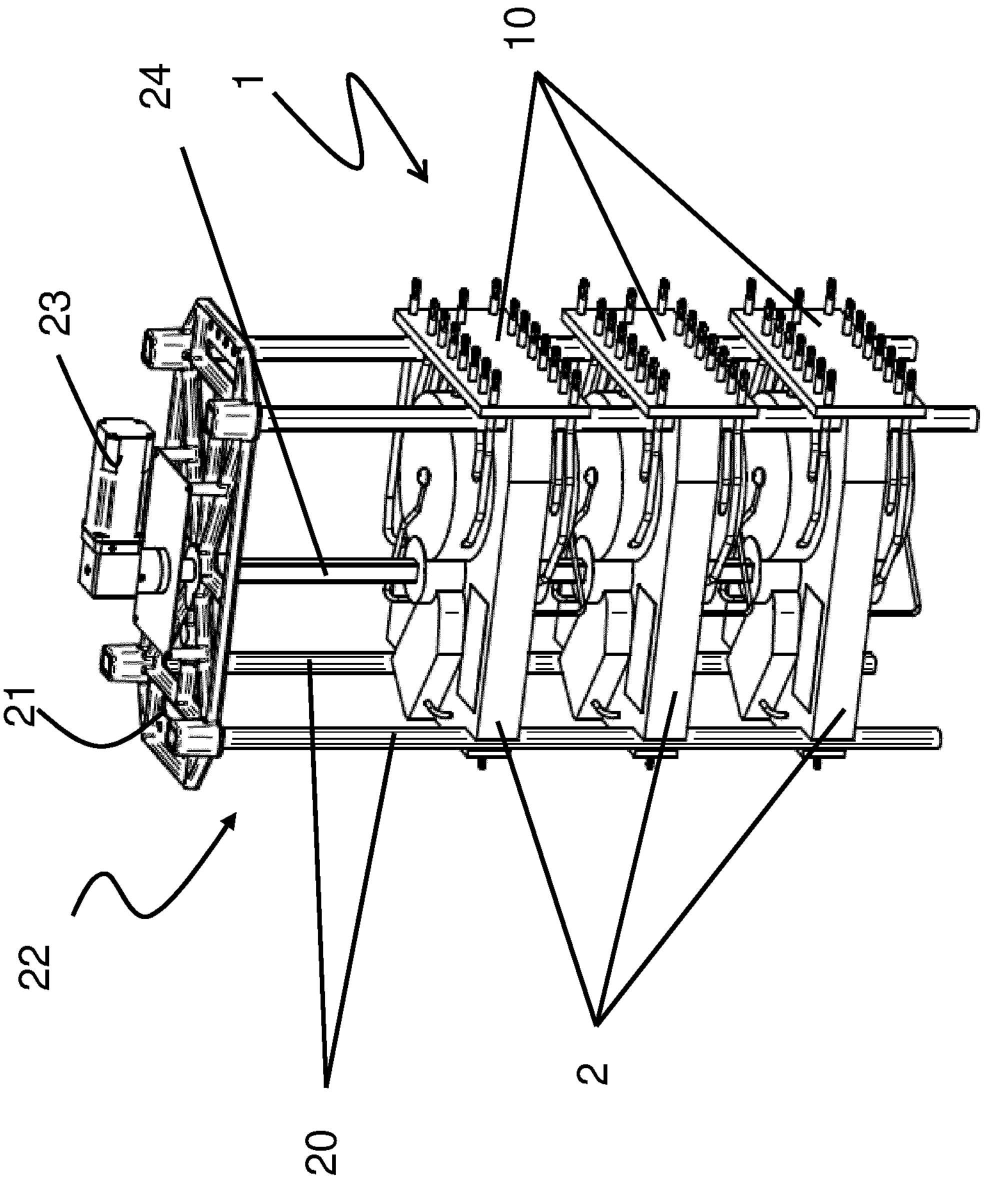
FIG. 2 shows a second embodiment of the on-load tap changer.

FIG. 2 shows the on-load tap-changer 1 according to an embodiment of the present disclosure with three on-load tap-changer plates 2. These are mechanically connected to one another via bars 20 and a top plate 21. The bars 20 and the top plate 21 form a frame 22. A motor 23 for actuating the on-load tap-changer 1 is arranged on the top plate 21. Here, the motor 23 drives a drive shaft 24, which extends through the three on-load tap-changer plates 2 and in so doing actuates the relevant diverter switch 6 and selector 5. In the embodiment shown here, the three on-load tap-changer plates 2 are arranged horizontally above one another in three planes. However, it is also possible to arrange the three on-load tap-changer plates 2 next to one another in one plane. It is furthermore possible that only one individual on-load tap-changer plate 2 and a top plate 21 are combined.

A motor 23 is then likewise arranged on the top plate 21 and actuates the on-load tap-changer 1 via the drive shaft 24. The connections 10 of the individual selectors 5 are arranged on one side of the on-load tap-changer plate or are oriented in a common direction.

Figure 3:
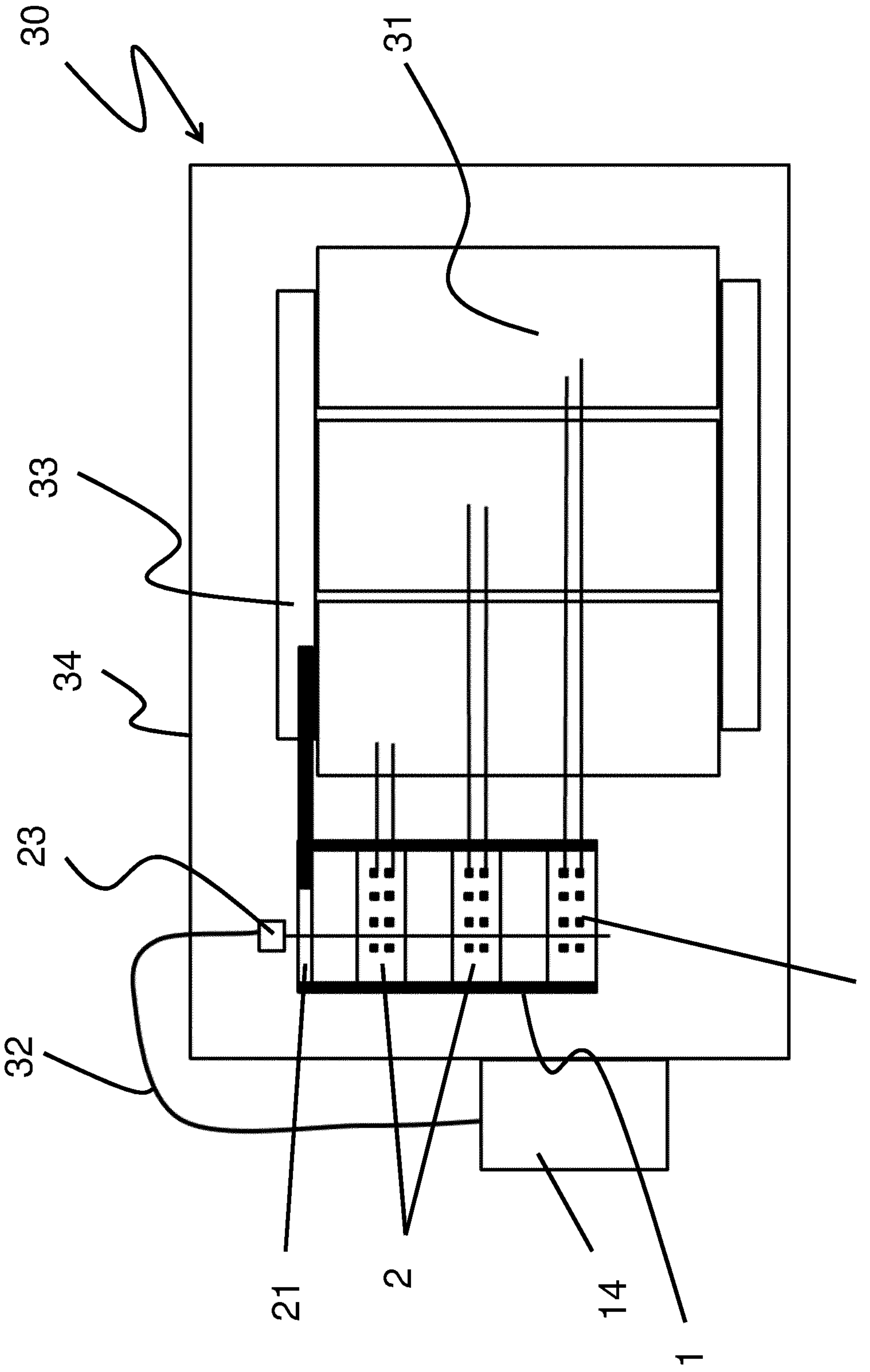
FIGS. 3 to 14 show a tap-changing transformer with different embodiments and arrangements of the on-load tap-changer.

FIG. 3 shows a first embodiment of a tap-changing transformer 30 with an on-load tap-changer 1 according to the present disclosure. The on-load tap-changer 1 comprises three on-load tap-changer plates 2, which are arranged oriented horizontally one above the other next to an active part 31. The motor 23 in this case is arranged on the top plate 21 in the interior of the tap-changing transformer 30. Power is supplied to the motor 23 via the control unit 14 via a cable 32, which is guided outwardly from the interior of the tap-changing transformer 30. The on-load tap-changer 1 is secured here to the yoke 33 of the active part 31 or to the cover 34 of the tap-changing transformer 30. The connections 10 of the selectors are preferably directed toward the active part 31 and thus toward the taps of the tap winding.

Figure 4:
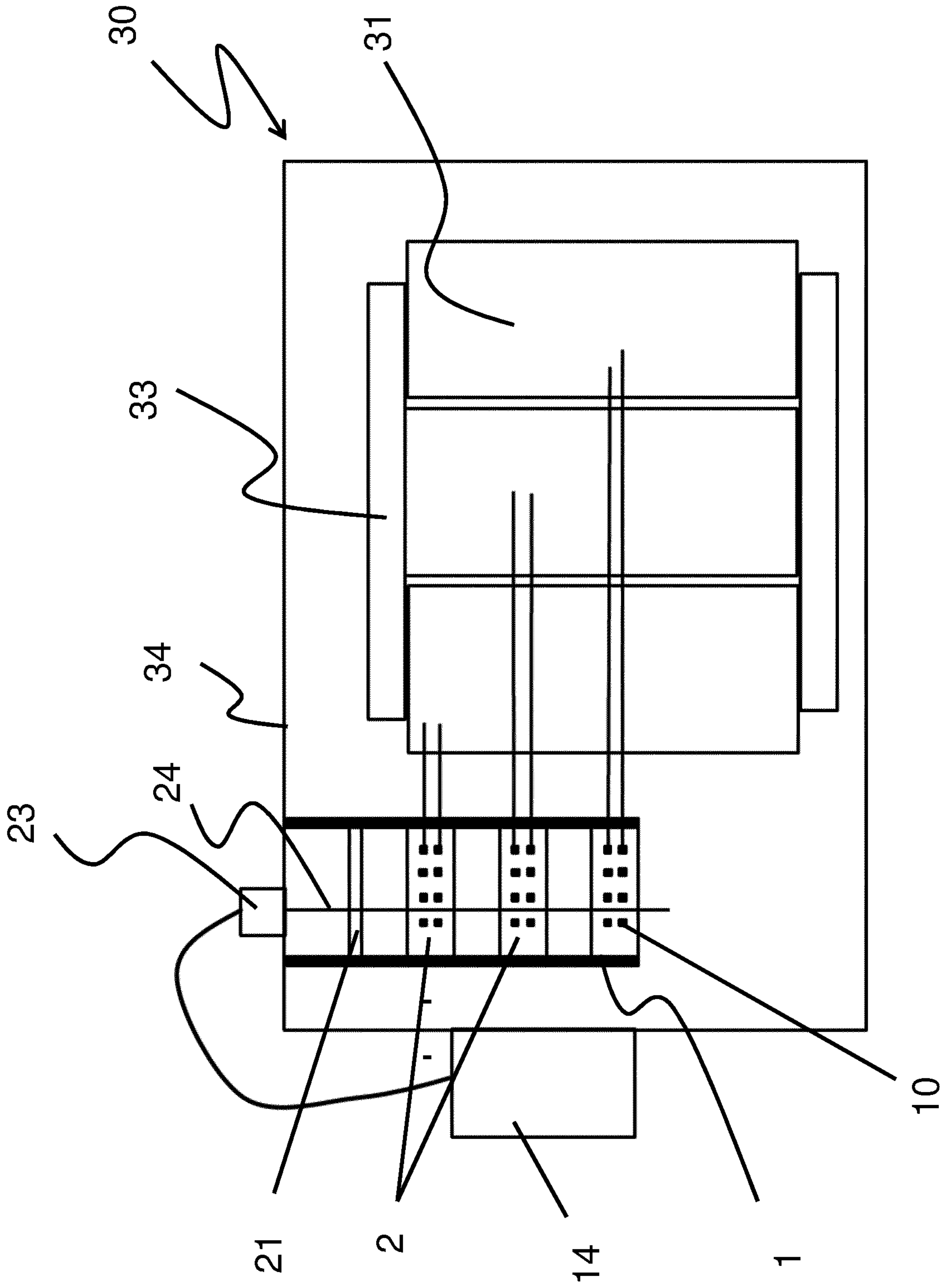

FIG. 4 shows a further embodiment of a tap-changing transformer 30, in which the motor 23 of the on-load tap-changer 1 is arranged outside the tap-changing transformer 30; here on the cover 34. The motor 23 can also be attached to any other outer wall of the tap-changing transformer 30. The motor, however, is then connected via a linkage or bevel gear to the on-load tap-changer 2 and in particular the drive shaft 24 thereof. The on-load tap-changer 1 can be secured via the top plate 21 to the yoke 33 of the active part 31 or to the cover 34.

Figure 5:
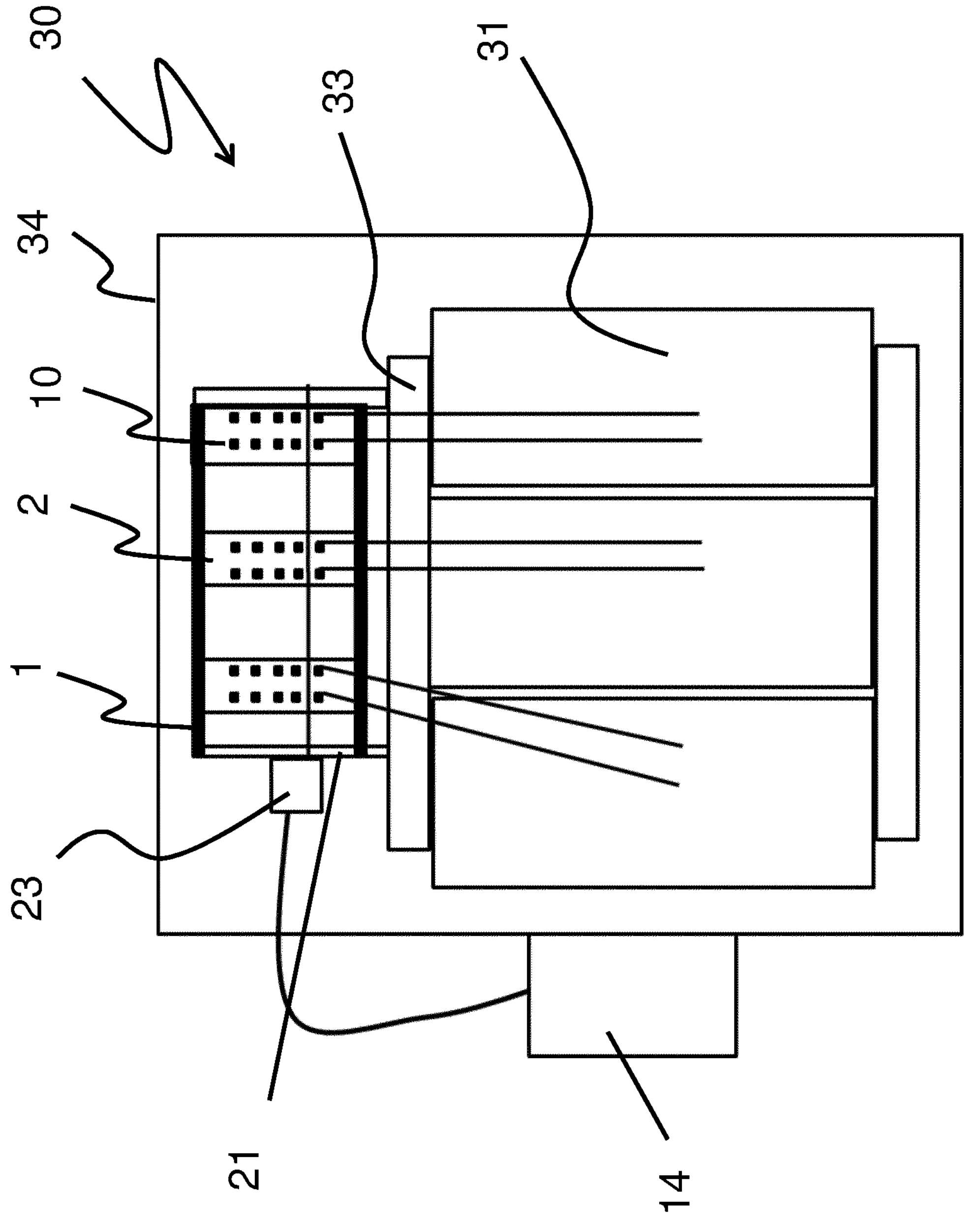

FIG. 5 shows a further embodiment of a tap-changing transformer 30 with an on-load tap-changer 1. The on-load tap-changer 1 is arranged here above the active part 31. The on-load tap-changer 1 has three on-load tap-changer plates 2, which are arranged vertically adjacently. The motor 23 in this case too is arranged on the top plate 21 in the interior of the tap-changing transformer 30. The on-load tap-changer 1 can be secured via the top plate 21 to the yoke 33 of the active part 31 or to the cover 34. The motor 23 of the on-load tap-changer 1 can also be arranged outside the tap-changing transformer 30.

Figure 6:
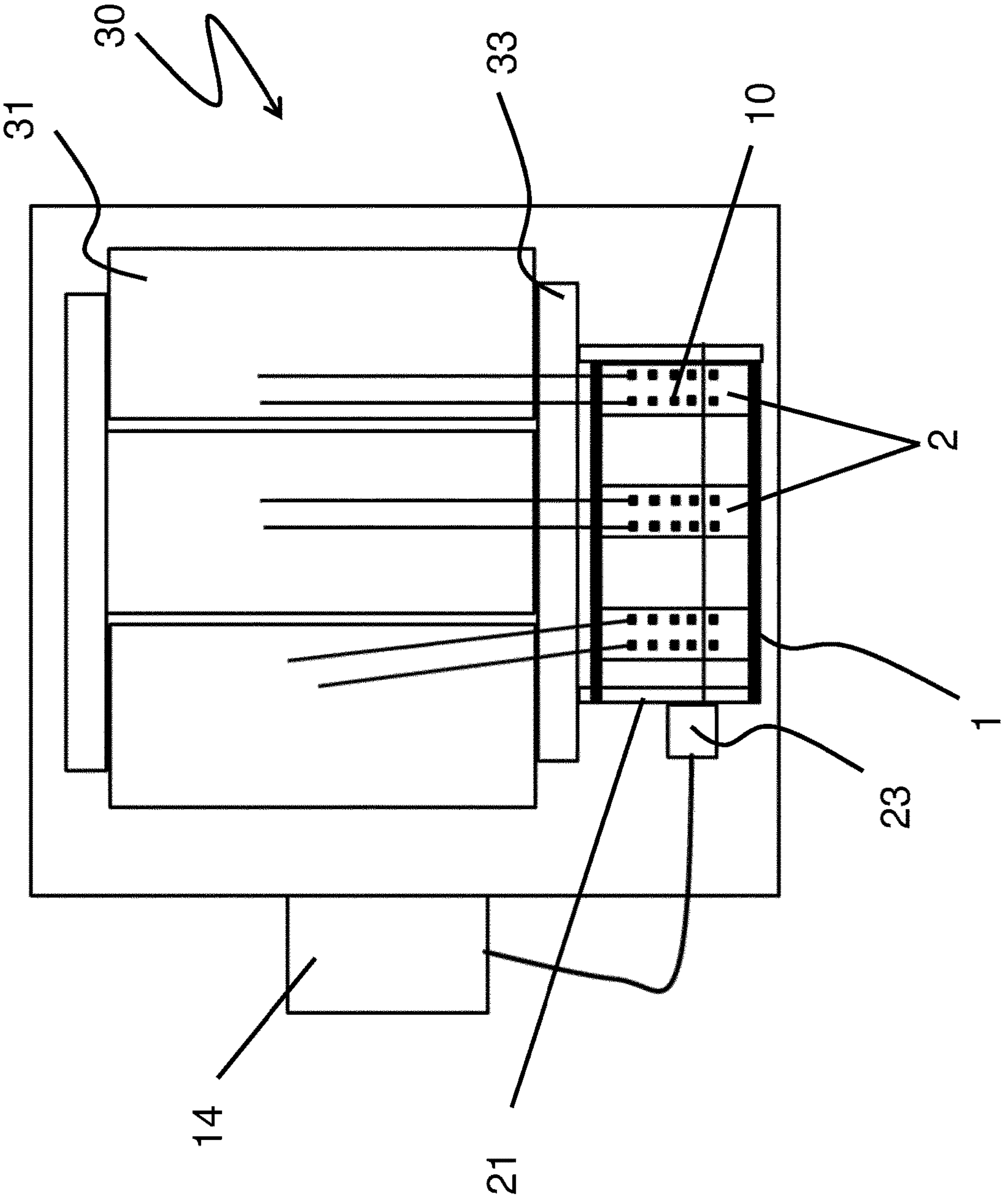

FIG. 6 shows a further embodiment of a tap-changing transformer 30 with an on-load tap-changer 1. The on-load tap-changer 1 is arranged here below the active part 31. The on-load tap-changer 1 has three on-load tap-changer plates 2, which are arranged vertically adjacently. The motor 23 in this case too is arranged on the top plate 21 in the interior of the tap-changing transformer 30. The on-load tap-changer 1 can be secured via the top plate 21 to the yoke 33 of the active part 31 or to the base part. The motor 23 of the on-load tap-changer 1 can also be arranged outside the tap-changing transformer 30.

Figure 7:
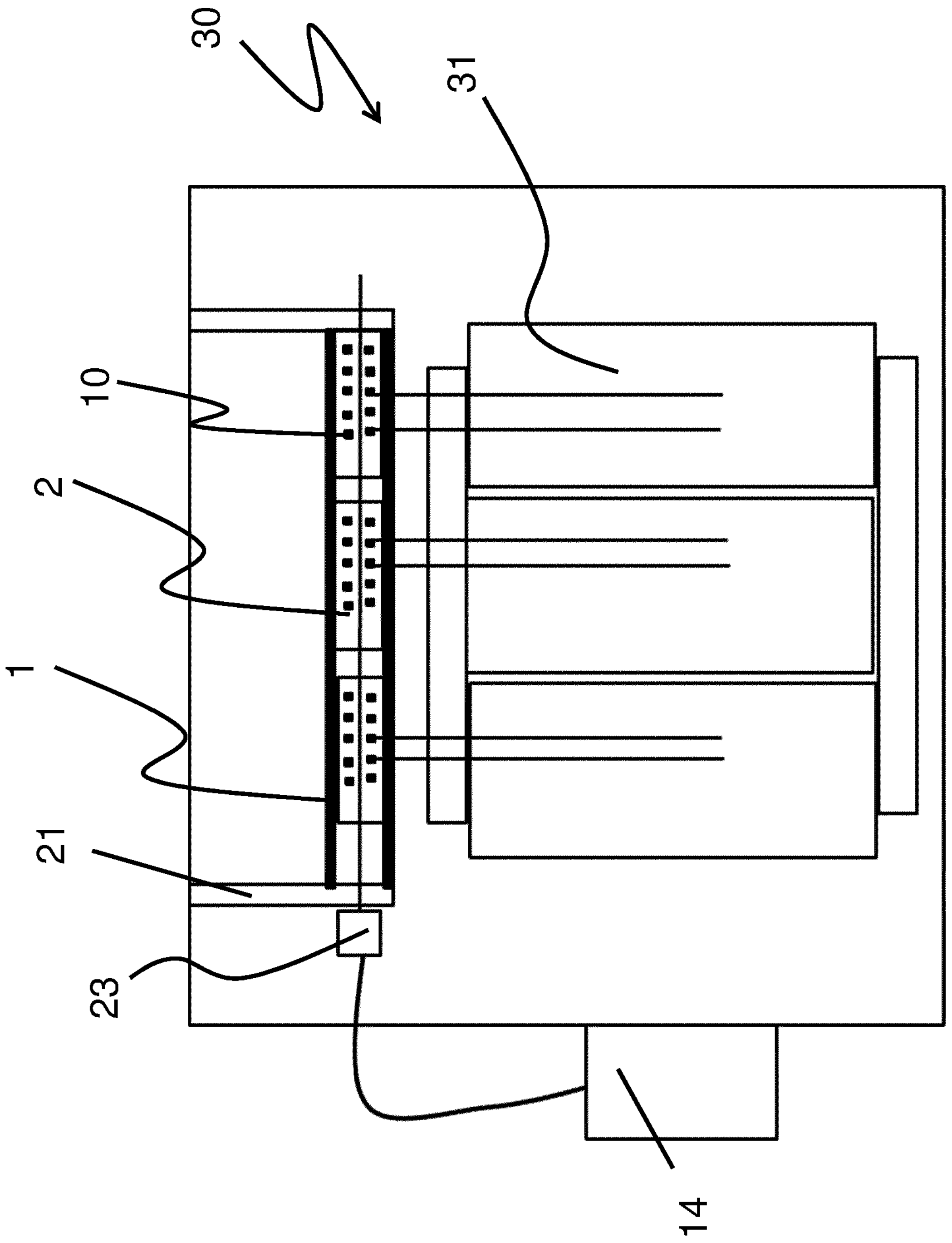

FIG. 7 shows a further embodiment of a tap-changing transformer 30 with an on-load tap-changer 1. The on-load tap-changer 1 is arranged here above the active part 31. The on-load tap-changer 1 has three on-load tap-changer plates 2, which are arranged horizontally adjacently in one plane. The motor 23 in this case too is arranged on the top plate 21 in the interior of the tap-changing transformer 30. This arrangement of the on-load tap-changer plates 2 in one plane is particularly space-saving. The on-load tap-changer 1 can be secured via the top plate 21 to the yoke 33 of the active part 31 or to the cover 34. The motor 23 of the on-load tap-changer 1 can also be arranged outside the tap-changing transformer 30.

Figure 8:
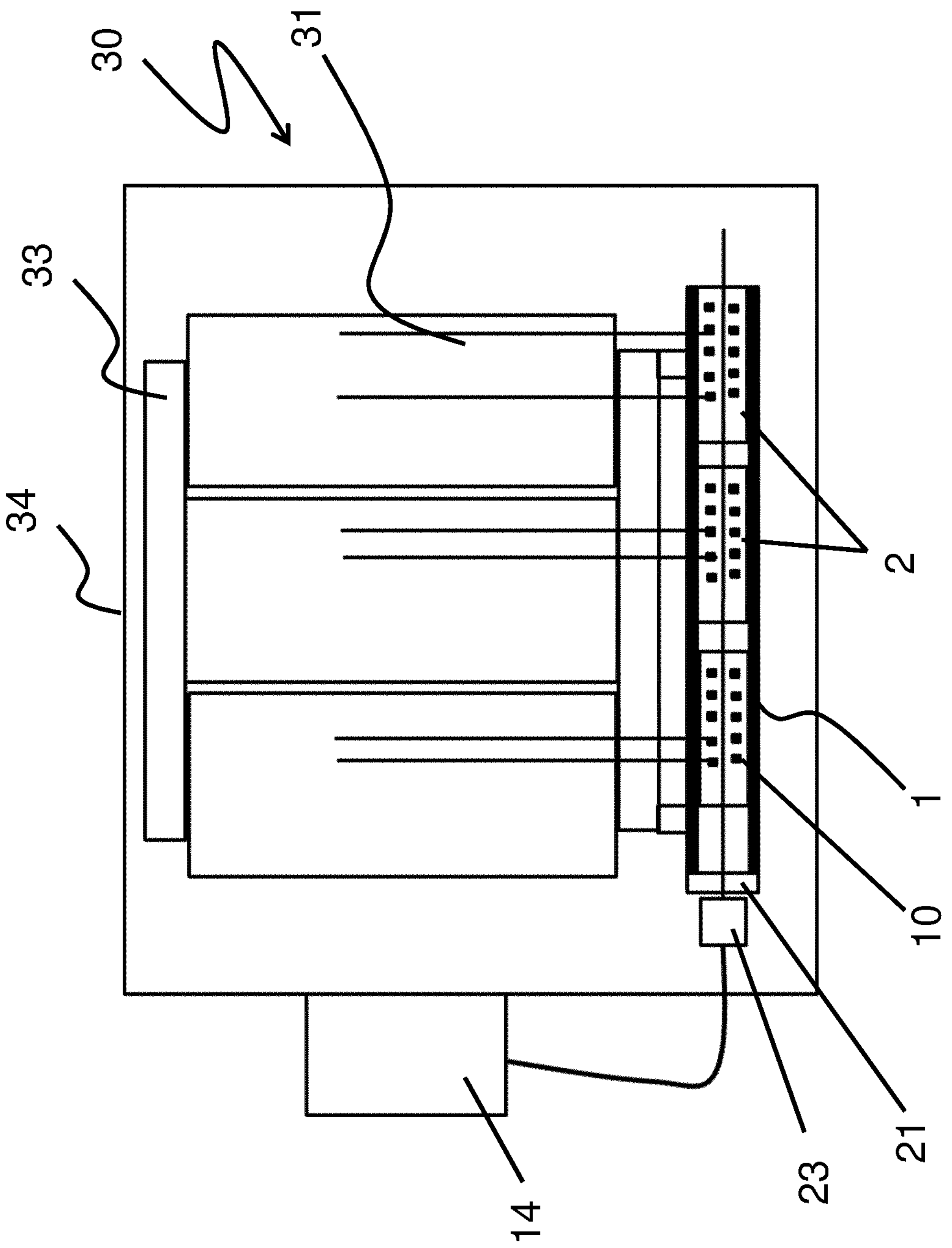

FIG. 8 shows a further embodiment of a tap-changing transformer 30 with an on-load tap-changer 2. The on-load tap-changer 2 is arranged here below the active part 31. The on-load tap-changer 1 has three on-load tap-changer plates 2, which are arranged horizontally adjacently in one plane. The motor 23 in this case too is arranged on the top plate 21 in the interior of the tap-changing transformer 30. The on-load tap-changer 1 can be secured via the top plate 21 to the yoke 33 of the active part 31 or to the base part. The motor 23 of the on-load tap-changer 1 can also be arranged outside the tap-changing transformer 30.

Figure 9:
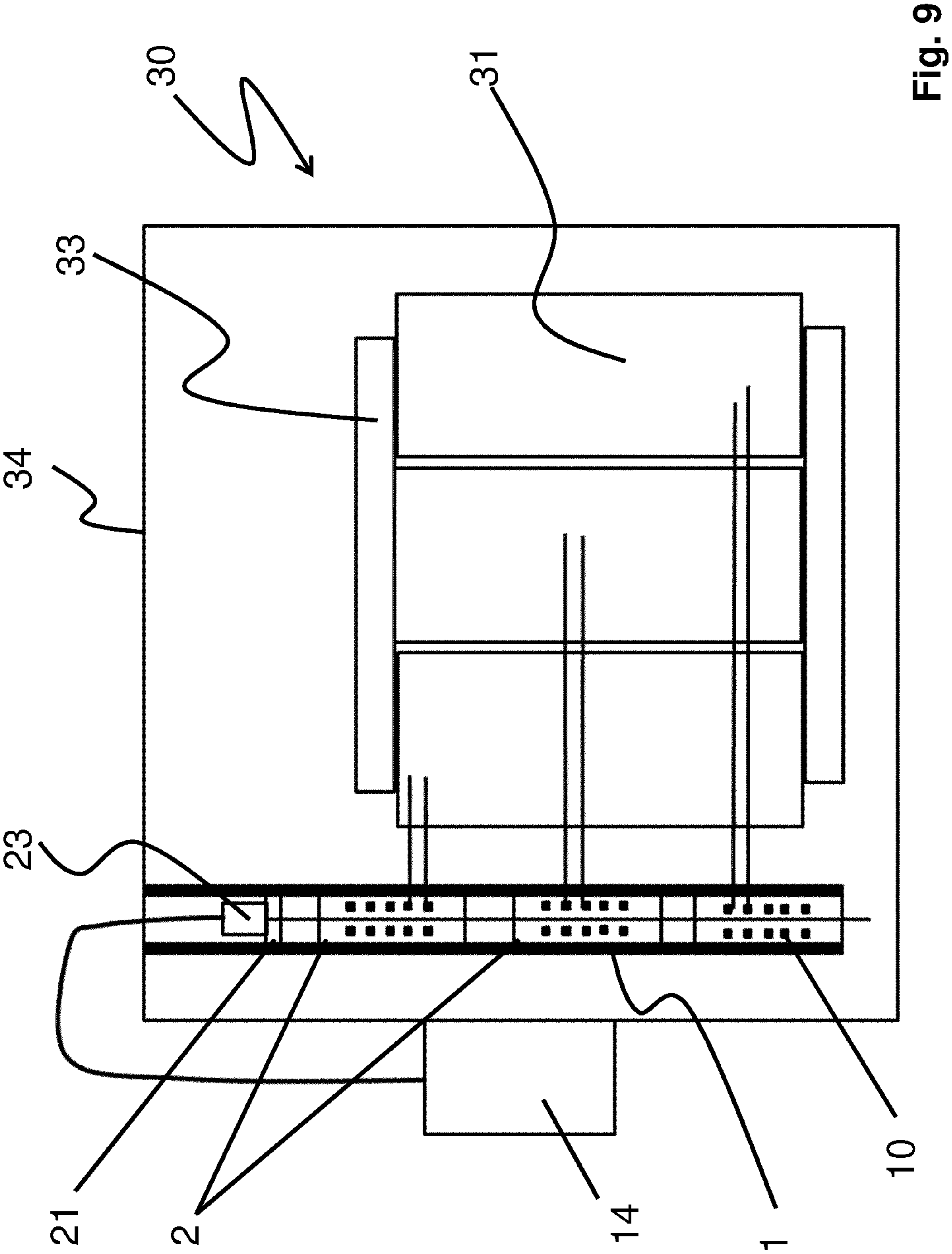

FIG. 9 shows a further embodiment of a tap-changing transformer 30 with an on-load tap-changer 1. The on-load tap-changer 1 is arranged here next to the active part 31. The on-load tap-changer 1 has three on-load tap-changer plates 2, which are arranged horizontally one below the other in one plane. The motor 23 in this case too is arranged on the top plate 21 in the interior of the tap-changing transformer 30. This arrangement variant is also particularly space-saving. The on-load tap-changer 1 can therefore be mounted particularly close to the active part 31. The on-load tap-changer 1 can be secured via the top plate 21 to the yoke 33 of the active part 31 or to the cover 34. The motor 23 of the on-load tap-changer 1 can also be arranged outside the tap-changing transformer 30.

Figure 10:
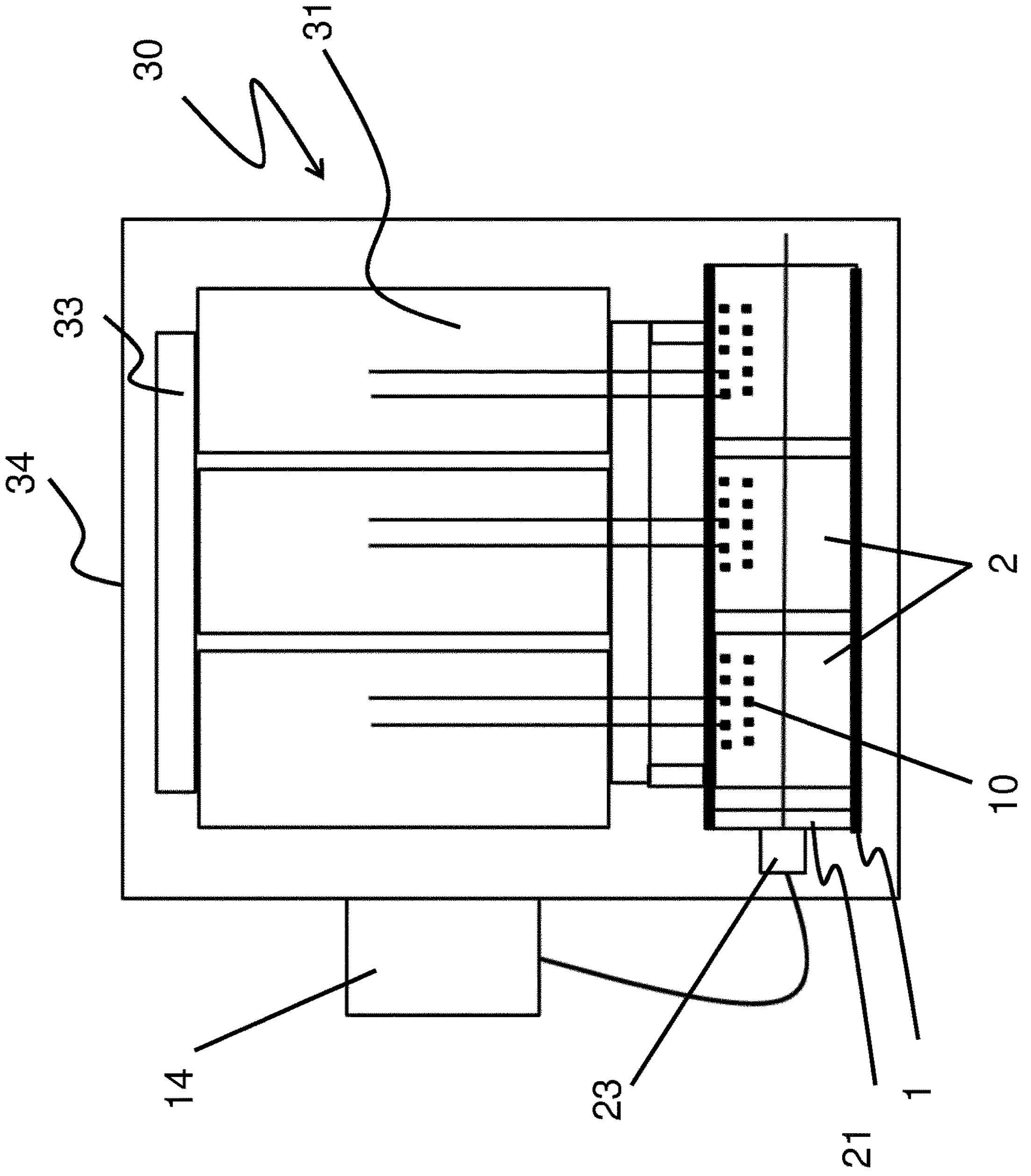

FIG. 10 shows a further embodiment of a tap-changing transformer 30 with an on-load tap-changer 1. The on-load tap-changer 1 is arranged here below the active part 31. The on-load tap-changer 1 has three on-load tap-changer plates 2, which are arranged horizontally adjacently in one plane. The motor 23 in this case too is arranged on the top plate 21 in the interior of the tap-changing transformer 30. The on-load tap-changer 1 can be secured via the top plate 21 to the yoke 33 of the active part 31 or to the base part. The motor 23 of the on-load tap-changer 1 can also be arranged outside the tap-changing transformer 30.

Figure 11:
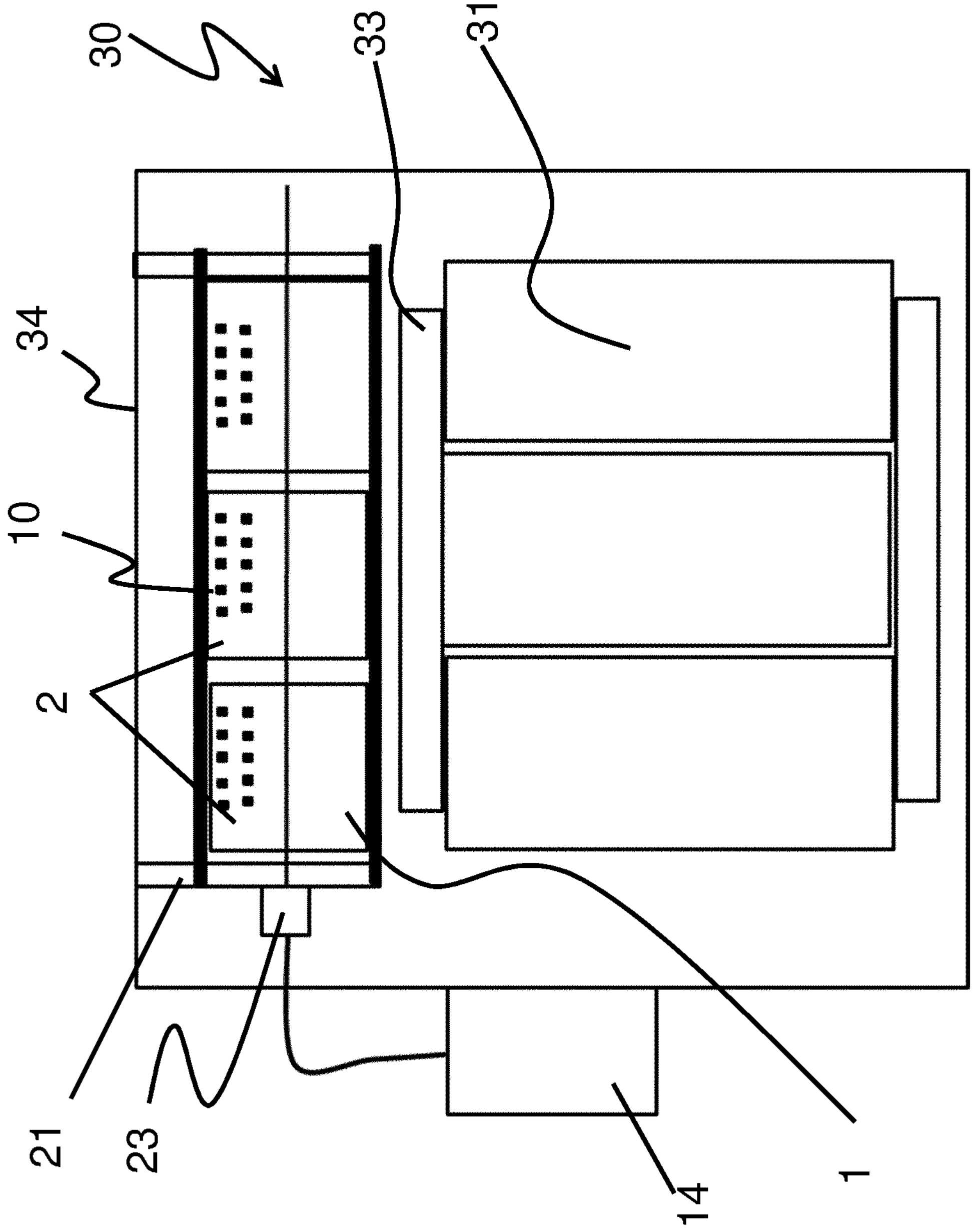

FIG. 11 shows a further embodiment of a tap-changing transformer 30 with an on-load tap-changer 1. The on-load tap-changer 1 is arranged here above the active part 31. The on-load tap-changer 1 has three on-load tap-changer plates 2, which are arranged horizontally adjacently in one plane. The motor 23 in this case too is arranged on the top plate 21 in the interior of the tap-changing transformer 30. The on-load tap-changer 1 can be secured via the top plate 21 to the yoke 33 of the active part 31 or to the cover 34. The motor 23 of the on-load tap-changer 1 can also be arranged outside the tap-changing transformer 30.

Figure 12:
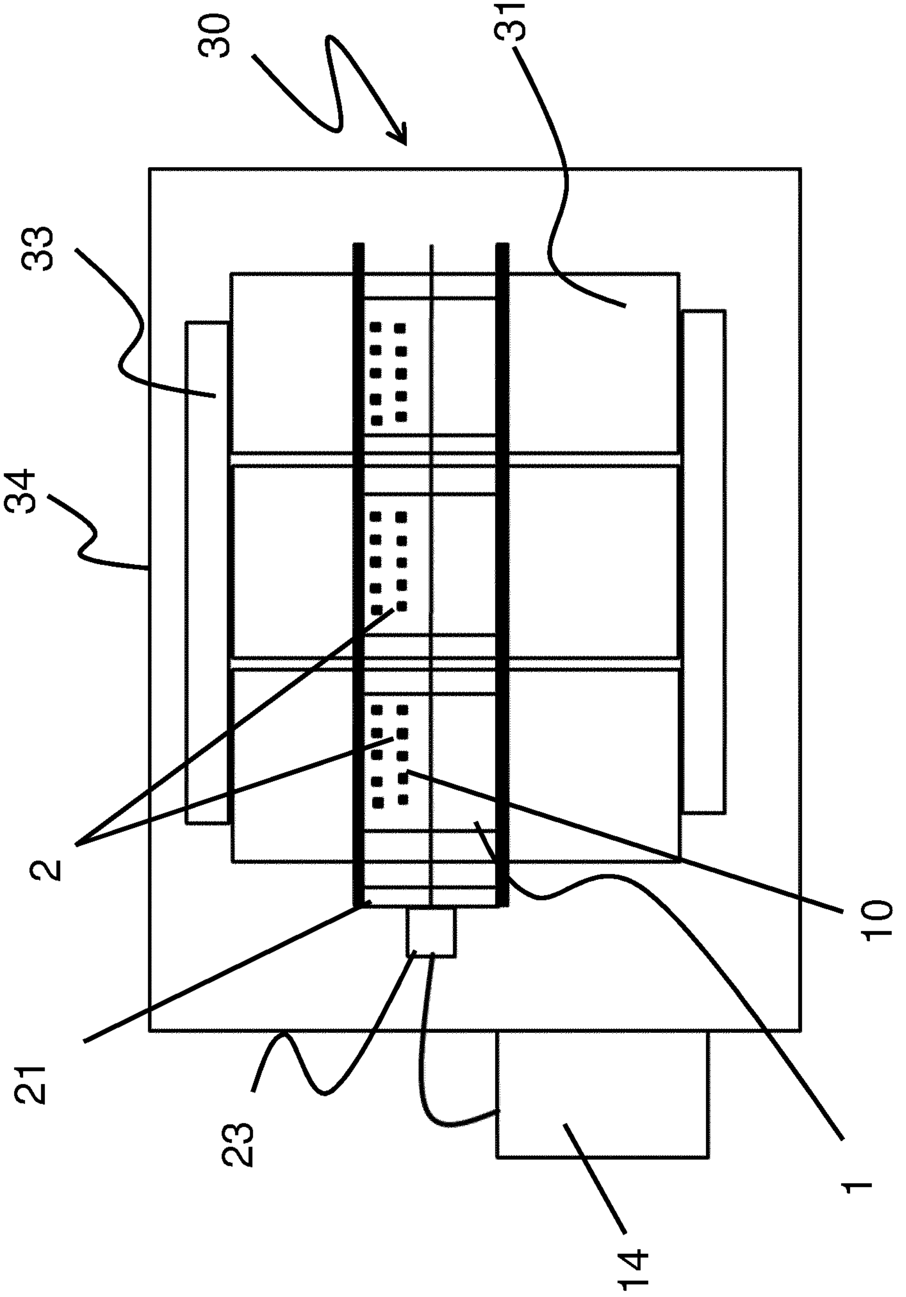

FIG. 12 shows a further embodiment of a tap-changing transformer 30 with an on-load tap-changer 1. The on-load tap-changer 1 is arranged here in front of, behind or next to the active part 31. The on-load tap-changer 1 has three on-load tap-changer plates 2, which are arranged horizontally adjacently in one plane. The motor 23 in this case too is arranged on the top plate 21 in the interior of the tap-changing transformer 30. This arrangement variant is also particularly space-saving. The on-load tap-changer 1 can therefore be mounted particularly close to the active part 31. The on-load tap-changer 1 can be secured via the top plate 21 to the yoke 33 of the active part 31, to the cover 34, or to a wall. The motor 23 of the on-load tap-changer 1 can also be arranged outside the tap-changing transformer 30.

Figure 13:
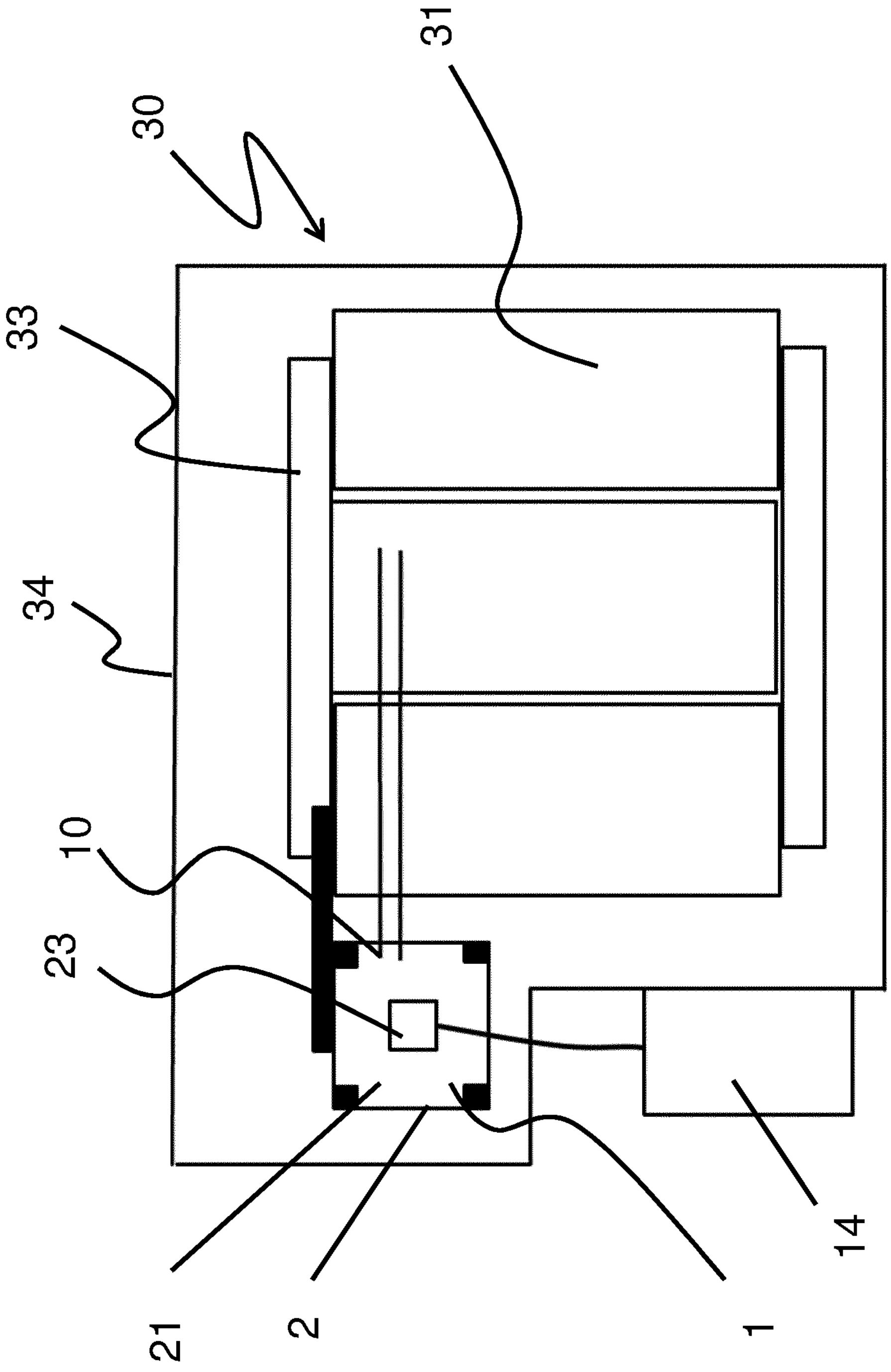

FIG. 13 shows a further embodiment of a tap-changing transformer 30 with an on-load tap-changer 1. The on-load tap-changer 1 is arranged here next to the active part 31 in the upper region. The on-load tap-changer 1 has three on-load tap-changer plates 2, which are arranged horizontally in succession. The motor 23 in this case too is arranged on the top plate 21 in the interior of the tap-changing transformer 30. This arrangement variant is also particularly space-saving. The on-load tap-changer 1 can therefore be mounted particularly close to the active part 31. The housing of the tap-changing transformer 30 can be of a particularly space-saving design. It is possible to dispense with the volume below the on-load tap-changer 1. The on-load tap-changer 1 can be secured via the top plate 21 to the yoke 33 of the active part 31 or to the cover 34. The motor 23 of the on-load tap-changer 1 can also be arranged outside the tap-changing transformer 30.

Figure 14:
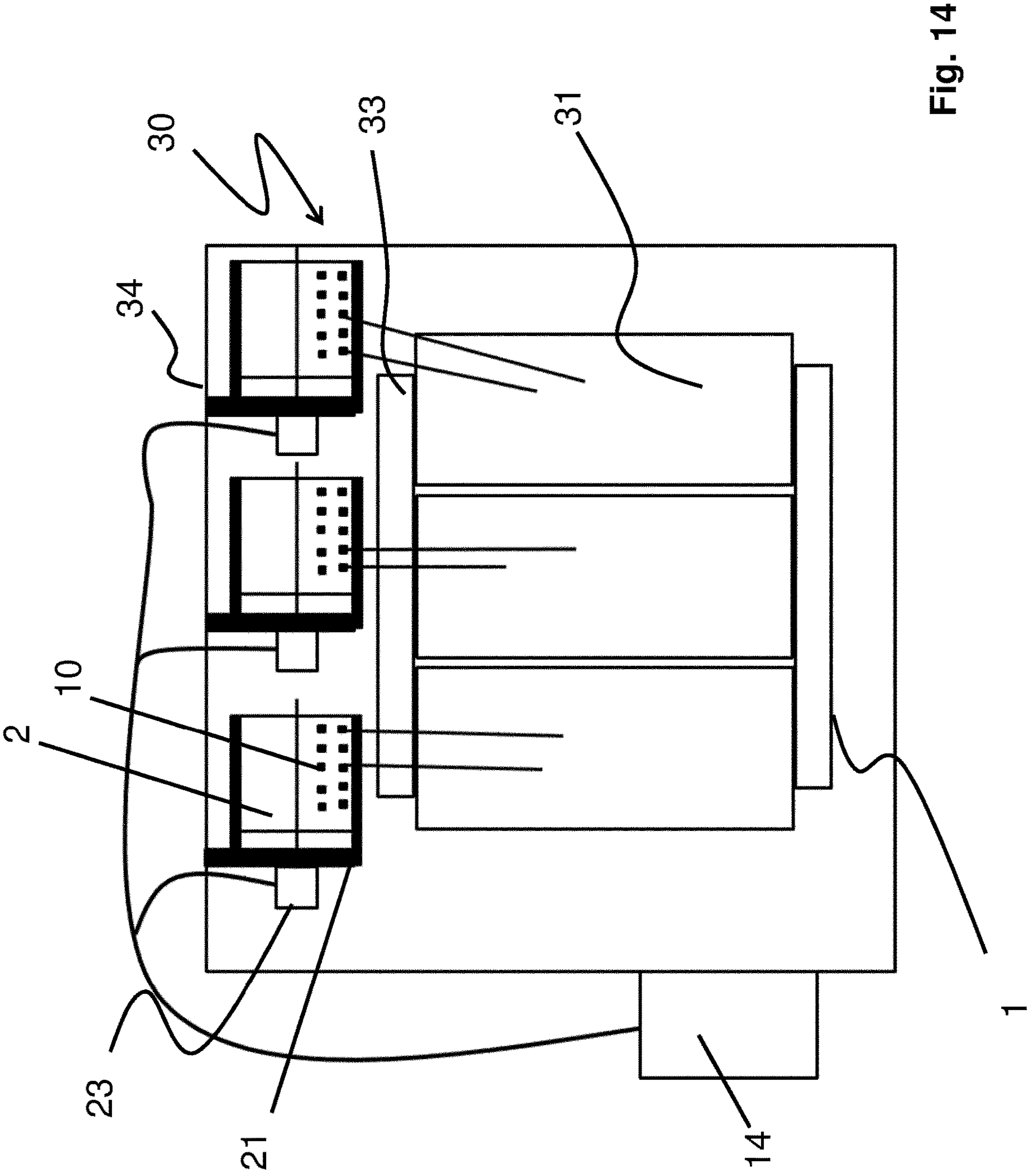

FIG. 14 shows a further embodiment of a tap-changing transformer 30 with three on-load tap-changers 1. Each on-load tap-changer 1 has a top plate 21 and an on-load tap-changer plate 2. Furthermore, a motor 23 is arranged on each top plate 21. All motors 23 are connected to a control unit 14 outside the tap-changing transformer 30. According to the implementation, the individual on-load tap-changers 1 are arranged differently in the vicinity of the active part. This embodiment is also particularly space-saving. The housing of the tap-changing transformer 30 can be of a particularly space-saving design.

According to a further embodiment the on-load tap-changer 1 can also be arranged outside the tap-changing transformer 30. It is then screwed in its own housing on the tap-changing transformer or secured to the latter. Here too, the motor 23 can also be arranged externally on the housing of the on-load tap-changer 1 or in the housing of the on-load tap-changer 1.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

LIST OF REFERENCE SIGNS

1 on-load tap-changer
2 on-load tap-changer plate
3 first side
4 second side
5 selector
5.1 first selector arm
5.2 second selector arm
6 diverter switch
7 vacuum interrupter
8 transition resistor
9 bridge switch
10 connections
11 first wall element
12 second wall element
13 change-over selector
14 control unit
20 bar
21 top plate
22 frame
23 motor
24 drive shaft
30 tap-changing transformer
31 active part
32 cable
33 yoke
34 cover

The invention claimed is:

1. An on-load tap-changer for uninterrupted diverter switch operation between different winding taps of a tap-changing transformer, the on-load tap-changer comprising:
- an on-load tap-changer plate comprising a first side and a second side opposite the first side;
- a selector; and
- a diverter switch,
- wherein:
  - the selector and the diverter switch are mounted on the on-load tap-changer plate,
  - the diverter switch comprises a vacuum interrupter, a transition resistor, and a bridge switch,
  - the selector comprises a first selector arm, a second selector arm, and a change-over selector,
  - the first selector arm is mounted on the first side of the on-load tap-changer plate, and
  - the second selector arm and the change-over selector are mounted on the second side of the on-load tap-changer plate.

2. The on-load tap changer as claimed in claim 1, wherein:
- the vacuum interrupter is mounted on the first side of the on-load tap-changer plate, and the transition resistor and the bridge switch are mounted on the second, opposite side of the on-load tap-changer plate.

3. The on-load tap changer as claimed in claim 1, wherein:
- the on-load tap-changer plate is cuboidal and has a first wall element, and
- connections for the selector are arranged in the first wall element.

4. The on-load tap changer as claimed in claim 1 wherein:
- three on-load tap-changer plates each with a diverter switch and each with a selector are provided;
- the three on-load tap-changer plates are mechanically connected to one another via a frame; and
- the diverter switches and selectors on the on-load tap-changer plates are configured to be actuated via a common drive shaft.

5. The on-load tap changer as claimed in claim 1, wherein:
- the selector further comprises selector contacts which extend from the first side to the second side of the on-load tap-changer plate.

6. The on-load tap changer as claimed in claim 1, wherein:
- the selector comprises selector contacts, a first plurality of the selector contacts corresponding to the first selector arm, and a second plurality of selector contacts corresponding to the second selector arm;
- the on-load tap-changer plate has a main body with a length, width, and height;
- the first side and the second side of the on-load tap-changer plate respectively are top and bottom surfaces of the main body that lay parallel to the length and the width of the main body of the on-load tap-changer plate;

the on-load tap changer plate comprises a wall coupled to the main body, the wall having a face surface perpendicular to the top and bottom surfaces of the main body;

the on-load tap changer further comprises connections arranged in the wall, the connections each being configured to couple to the different winding taps of the tap-changing transformer;

the connections comprise a first set of connections, and a second set of connections spaced apart from the first set of connections;

the first set of connections are coupled to the first plurality of selector contacts; and the second set of connections are coupled to the second plurality of selector contacts.

7. A tap-changing transformer, the tap-changing transformer comprising the on-load tap-changer as claimed in claim 1, wherein:

an active part, comprising a core and tap windings, of the tap-changing transformer is arranged in an interior of the tap-changing transformer; and the on-load tap-changer is arranged in the interior of the tap-changing transformer next to or above or below the active part.

8. The tap-changing transformer with the on-load tap-changer as claimed in claim 7, wherein:

the on-load tap-changer plate of the on-load tap-changer is oriented horizontally or vertically relative to the active part.

9. The tap-changing transformer with the on-load tap-changer as claimed in claim 7, wherein:

a motor for actuating a drive shaft of the on-load tap-changer is arranged inside the tap-changing transformer or outside the tap-changing transformer.

10. The tap-changing transformer with the on-load tap-changer as claimed in claim 7, wherein:

the on-load tap-changer further comprises three on-load tap-changer plates each with a respective one of a plurality of diverter switches and a respective one of a plurality of selectors;

the three on-load tap-changer plates are mechanically connected to one another via a frame; and the diverter switches and the selectors on the on-load tap-changer plates are configured to all be actuated via a common drive shaft;

the three on-load tap-changer plates of the on-load tap-changer are oriented horizontally or vertically relative to the active part;

the on-load tap-changer plates of the on-load tap-changer are arranged in different places or a common plane relative to one another;

the three on-load tap changer plates comprise the on-load tap-changer plate, the selectors comprise the selector; and the diverter switches comprise the diverter switch.

* * * * *